(12) United States Patent
Hatsugai et al.

(10) Patent No.: US 8,093,732 B2
(45) Date of Patent: Jan. 10, 2012

(54) ENGINE-DRIVEN POWER GENERATOR WITH GAS-LIQUID SEPARATION UNIT

(75) Inventors: Tsutomu Hatsugai, Wako (JP); Makoto Yamada, Wako (JP); Takeshi Sasajima, Wako (JP); Taiyo Onodera, Wako (JP)

(73) Assignee: HHonda Motor Co., Ltd., Tokyo (JP)

( * ) Notice: Subject to any disclaimer, the term of this patent is extended or adjusted under 35 U.S.C. 154(b) by 357 days.

(21) Appl. No.: 12/403,012

(22) Filed: Mar. 12, 2009

(65) Prior Publication Data
US 2009/0230697 A1    Sep. 17, 2009

(30) Foreign Application Priority Data
Mar. 14, 2008  (JP) .................. 2008-066753

(51) Int. Cl.
*H02K 5/00* (2006.01)
(52) U.S. Cl. ........................... 290/1 A; 290/1 B

(58) Field of Classification Search .................. 290/1 A, 290/1 B
See application file for complete search history.

(56) References Cited

U.S. PATENT DOCUMENTS
6,362,533 B1 * 3/2002 Morohoshi et al. ........... 290/1 A
6,964,255 B2 * 11/2005 Shomura et al. .......... 123/198 E FOREIGN PATENT DOCUMENTS
CN       1286350 A     3/2001
JP       07-312846 A   11/1995
JP       2002-272061 A  9/2002

* cited by examiner

*Primary Examiner* — Tho D Ta
(74) *Attorney, Agent, or Firm* — Arent Fox, LLP

(57) ABSTRACT

Engine-driven power generator includes: a power generation section having a drive shaft connected to a crankshaft; a gas-liquid separation unit provided upstream of the power generation section and having an air inlet port for taking in cooling air, the inlet port being disposed immediately under a fuel tank, the separation unit separating moisture from the taken-in air; and a cooling fan rotatable by the drive shaft to direct the taken-in air into the power generation section.

2 Claims, 8 Drawing Sheets

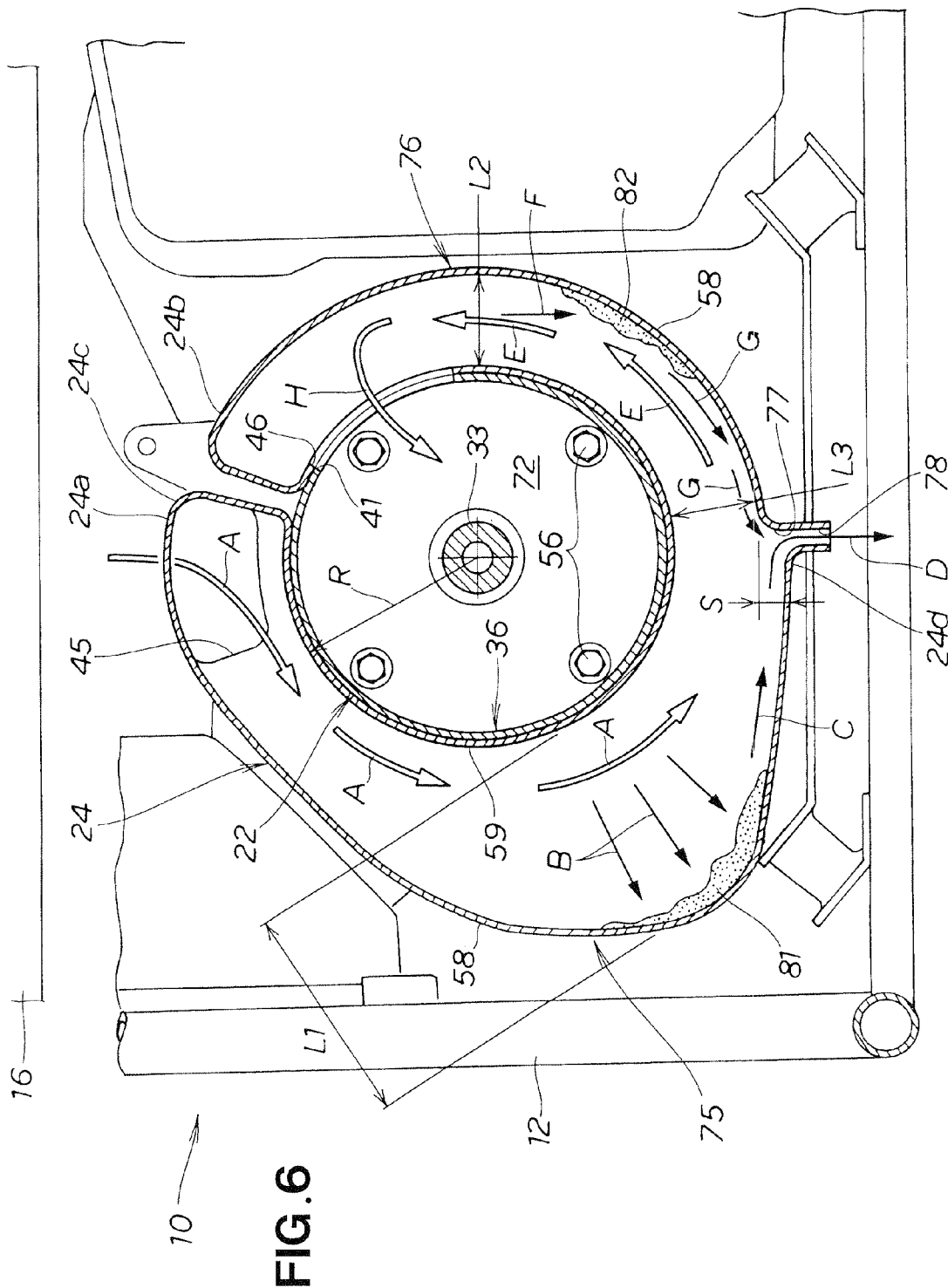

ENGINE-DRIVEN POWER GENERATOR WITH GAS-LIQUID SEPARATION UNIT

CROSS-REFERENCE TO RELATED APPLICATION

This application claims the priority of Japanese Application No. P2008-066753, filed Mar. 14, 2008 the entire specification, claims and drawings of which are incorporated herewith by reference.

FIELD OF THE INVENTION

The present invention relates to an engine-driven power generator which has a drive shaft of a power generation section connected to a crankshaft of an engine, and in which a cooling fan is rotated by the drive shaft to direct cooling air into the power generation section.

BACKGROUND OF THE INVENTION

Among the conventionally-known engine-driven power generators are ones which have a drive shaft of a power generation section connected concentrically to a crankshaft of an engine, in which a cooling fan of the power generation section is provided between the engine and the power generation section, and in which an external air intake port is provided in a portion of the power generation section opposite from the cooling fan. One example of such engine-driven power generators is disclosed in Japanese Patent Application Laid-Open Publication No. HEI-7-312846.

With the prior art engine-driven power generator disclosed in the HEI-7-312846 publication, external air can be introduced, by rotation of the cooling fan via the drive shaft, into the power generation section, through the air intake port provided in the power generation section opposite from the cooling fan, to thereby cool the power generation section. More specifically, the air intake port is located on an outer side portion of the engine-driven power generator. Thus, if the engine-driven power generator is used in an environment where it tends to easily get wet with moisture or small drops of water (hereinafter referred to as "moisture"), moisture-containing air may be undesirably taken in through the air intake port and introduced to the interior of the power generation section. Consequently, in such an environment, there would be imposed a great limitation on the use of the engine-driven power generator.

SUMMARY OF THE INVENTION

In view of the foregoing prior art problems, it is an object of the present invention to provide an improved engine-driven power generator which can be used with a reduced limitation in an environment where it tends to easily get wet with moisture.

In order to accomplish the above-mentioned object, the present invention provides an improved engine-driven power generator, which comprises: a power generation section having a drive shaft connected to a crankshaft of an engine, a fuel tank of the engine being disposed over the power generation section and the engine; a gas-liquid separation unit provided upstream of the power generation section and having an air inlet port for taking in cooling air, the air inlet port being disposed immediately under the fuel tank, the gas-liquid separation unit separating moisture, contained in the cooling air taken in via the air inlet port, from the air; and a cooling fan rotatable by the drive shaft to direct, into the power generation section, the cooling air taken in via the air inlet port and having the moisture separated therefrom via the gas-liquid separation unit.

Even in an environment where the engine-driven power generator tends to easily get wet with water or moisture, the present invention can prevent moisture-containing air from being introduced through the air inlet port into the power generation section, by the fuel tank covering the air inlet port. Further, the gas-liquid separation unit, which is disposed upstream of the power generation section, can separate the moisture from the air taken in through the air inlet port, to thereby prevent moisture-containing air from being introduced into the power generation section. In this way, the present invention can reliably prevent moisture-containing air, taken in through the air inlet port, from being introduced into the power generation section.

Preferably, the gas-liquid separation unit has the air inlet port formed in one end portion thereof, and an air outlet port formed in another end portion thereof for discharging the air, taken in through the air inlet port, out of the gas-liquid separation unit, the gas-liquid separation unit is in the form of a duct formed into a generally annular shape such that the air inlet port and the air outlet port are located adjacent to each other in an upper duct portion of the gas-liquid separation unit, and the gas-liquid separation unit includes: a centrifugal separation section provided, in a region of the gas-liquid separation unit between the air inlet port and a lower duct portion, for separating moisture, contained in the air, from the air by centrifugal force; and a by-weight separation section provided, in another region of the gas-liquid separation unit between the lower duct portion and the air outlet portion, for separating moisture, contained in the air, from the air utilizing a weight of the moisture. Because the centrifugal separation section, provided between the air inlet port and the lower duct portion, separates moisture from the air by centrifugal force while the by-weight separation section, provided between the lower duct portion and the air outlet portion, separates moisture from the air utilizing the weight of the moisture, the present invention can reliably separate and remove moisture from the air by means of the gas-liquid separation unit.

Further, preferably, the lower duct portion has a stepped portion opposed to the centrifugal separation section, and the stepped portion has a downward water discharge port formed therein for discharging the separated moisture out of the gas-liquid separation unit. Thus, when the moisture, separated from the air by means of the centrifugal separation section, has moved down to the lower duct portion, it hits the stepped portion and then is directed to the downward water discharge port. In this way, the moisture having hit the stepped portion can be reliably discharged out of the separation unit through the discharge port.

BRIEF DESCRIPTION OF THE DRAWINGS

Certain preferred embodiments of the present invention will hereinafter be described in detail, by way of example only, with reference to the accompanying drawings, in which:

FIG. 6 is a sectional view showing the gas-liquid separation unit;

DETAILED DESCRIPTION OF THE PREFERRED EMBODIMENTS

Figure 1:
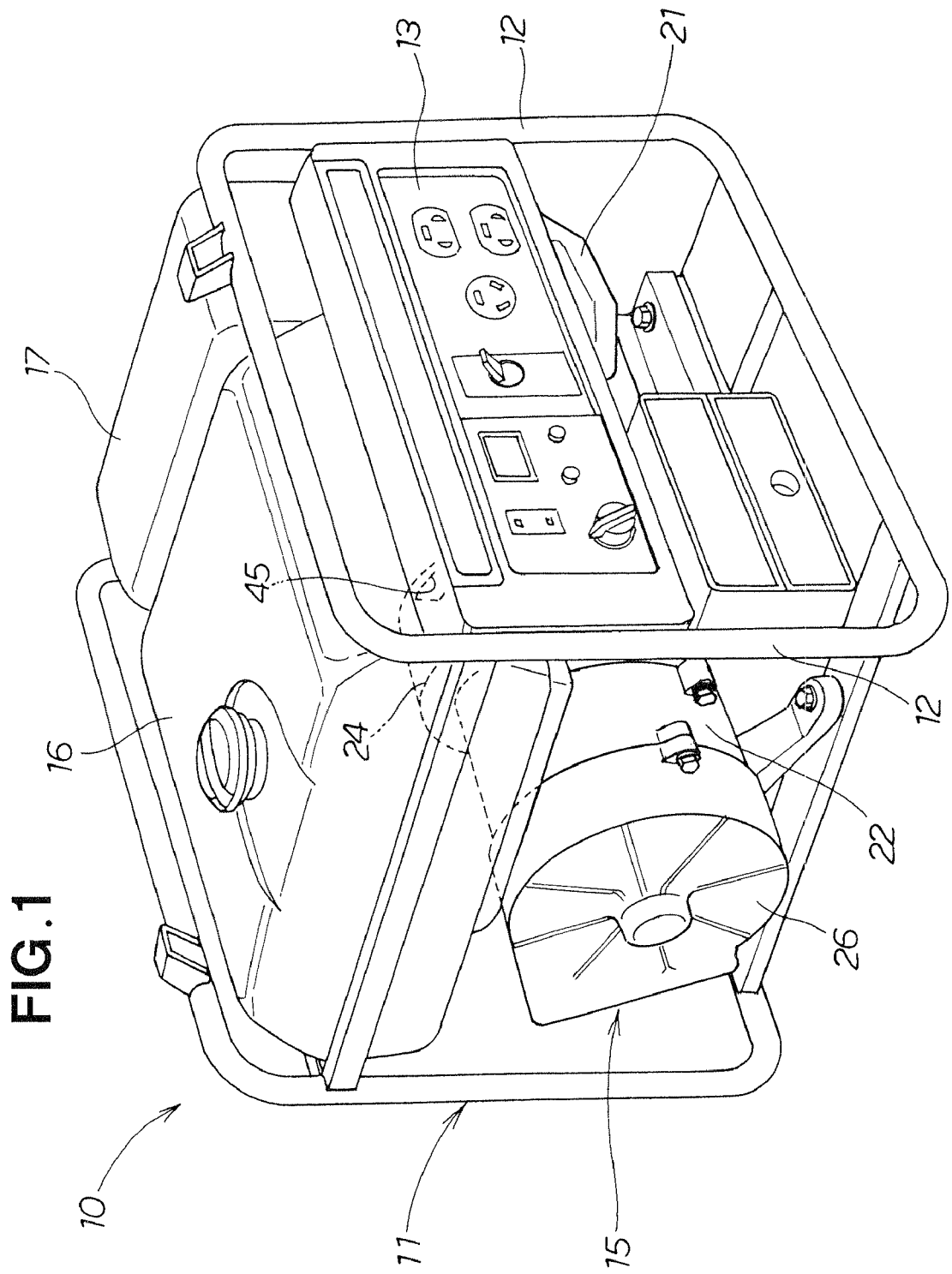
FIG. 1 is a perspective view showing an embodiment of an engine-driven power generator of the present invention.

Reference is now made to FIG. 1 showing in perspective an embodiment of an engine-driven power generator of the present invention. The engine-driven power generator 10 comprises: a frame 11 constructed of a plurality of struts 12 etc. and having a substantial cubic shape; a control panel 13 disposed between a pair of the struts 12; an engine/power generation section unit 15 disposed inside the frame 11; and a fuel tank 16 and muffler 17 provide over the engine/power generation section unit 15. The control panel 13 has accommodated therein various electric and electronic component parts to constitute an engine control section and an electric power take-out section.

Figure 2:
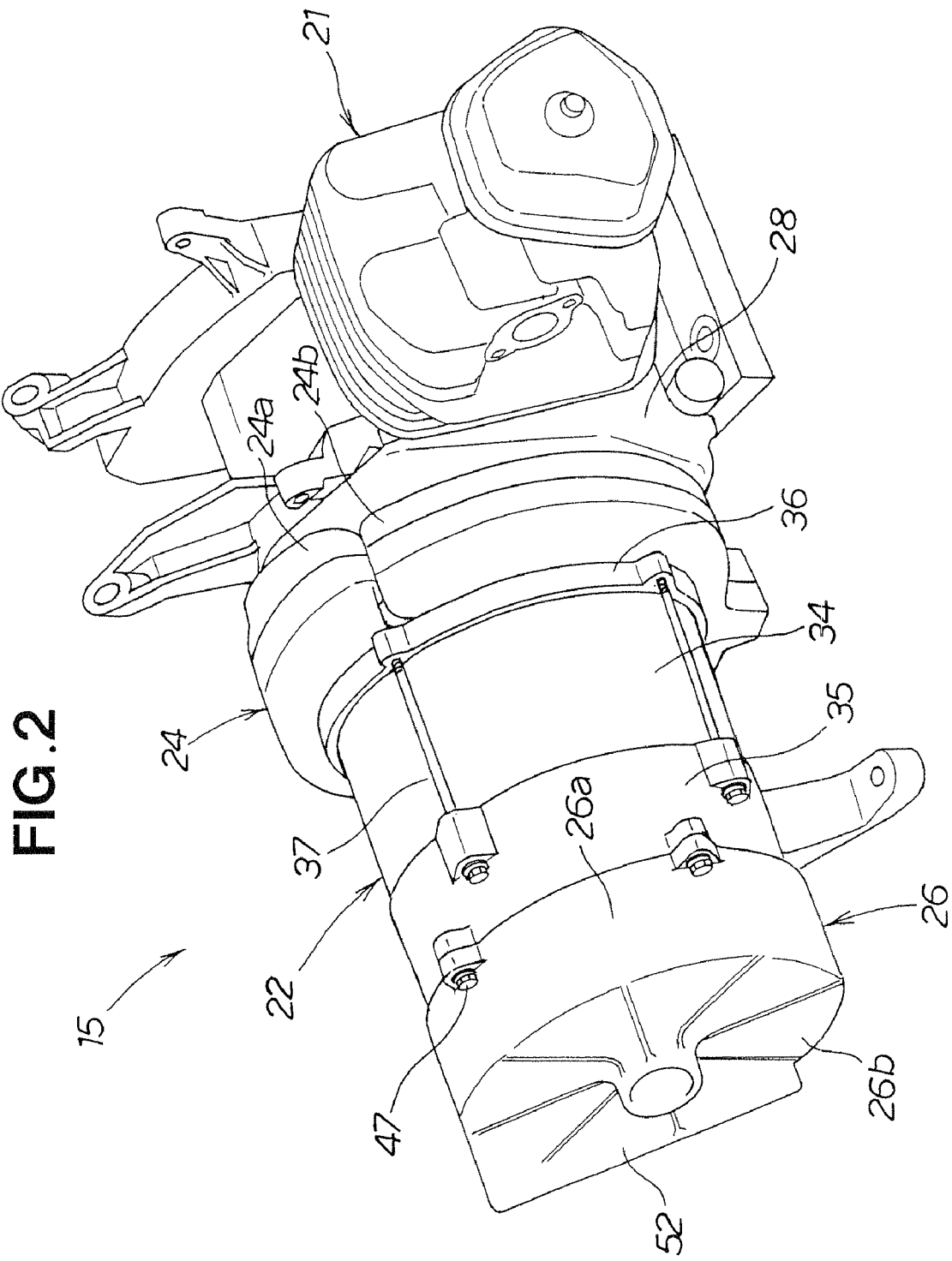
FIG. 2 is a perspective view showing an engine/power generation section unit employed in the embodiment of the engine-driven power generator of FIG. 1.
Figure 3:
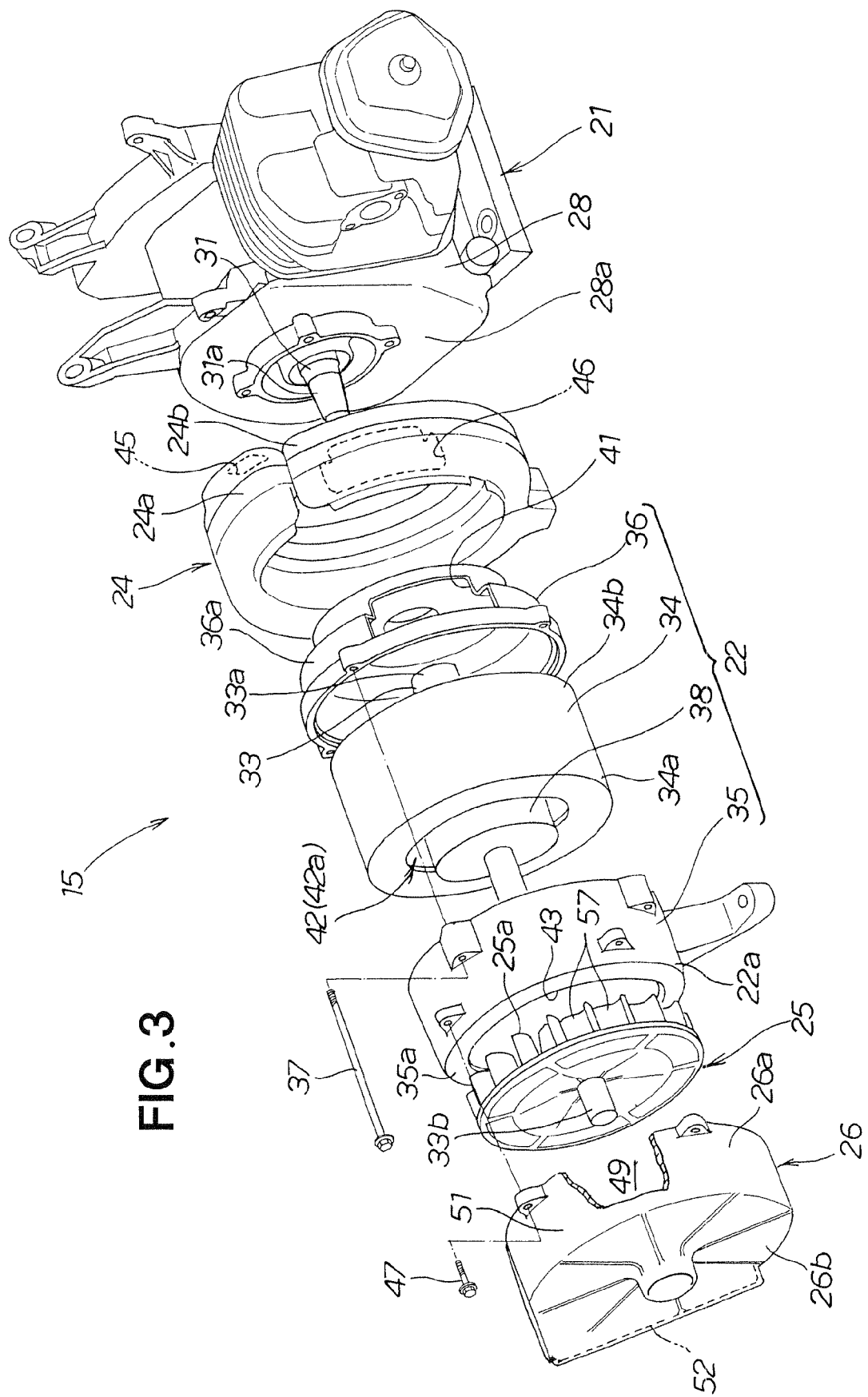
FIG. 3 is an exploded perspective view showing the engine/power generation section unit.

Reference is made next to FIG. 2 showing in perspective the engine/power generation section unit 15, and to FIG. 3 showing in exploded perspective the engine/power generation section unit 15.

The engine/power generation section unit 15 includes: an engine 21; a power generation section 22 connected to the engine 21; an gas-liquid separation unit 24 disposed in a space between the power generation section 22 and the engine 21; a cooling fan 25 fixed to a front end portion 22a of the power generation section 22; and a fan cover 26 covering the cooling fan 25.

In the engine 21, a crankshaft 31 has a front end portion 31a projecting forward beyond a front wall portion 28a of a crankcase 28. The power generation section 22 is connected to the front wall portion 28a of the crankcase 28.

The power generation section 22 includes a drive shaft 33 having a rear end portion 33a connected concentrically to the front end portion 31a of the crankshaft 31. The power generation section 22 has front and rear covers 35 and 36 fixed to front and rear end portions 34a and 34b of a stator 34 by means of bolts 37, the drive shaft 33 extends through the stator 34 and front and rear covers 35 and 36, and a rotator 38 is mounted on the drive shaft 33.

Inlet port 41 is formed, in part of a circumferential wall 36a of the rear cover 36 of the power generation section 22, in communication with a cooling air intake passage 42 (see also FIG. 4) within the power generation section 22. Outlet port 43 is formed in a front wall 35a of the front cover 35.

Figure 4:
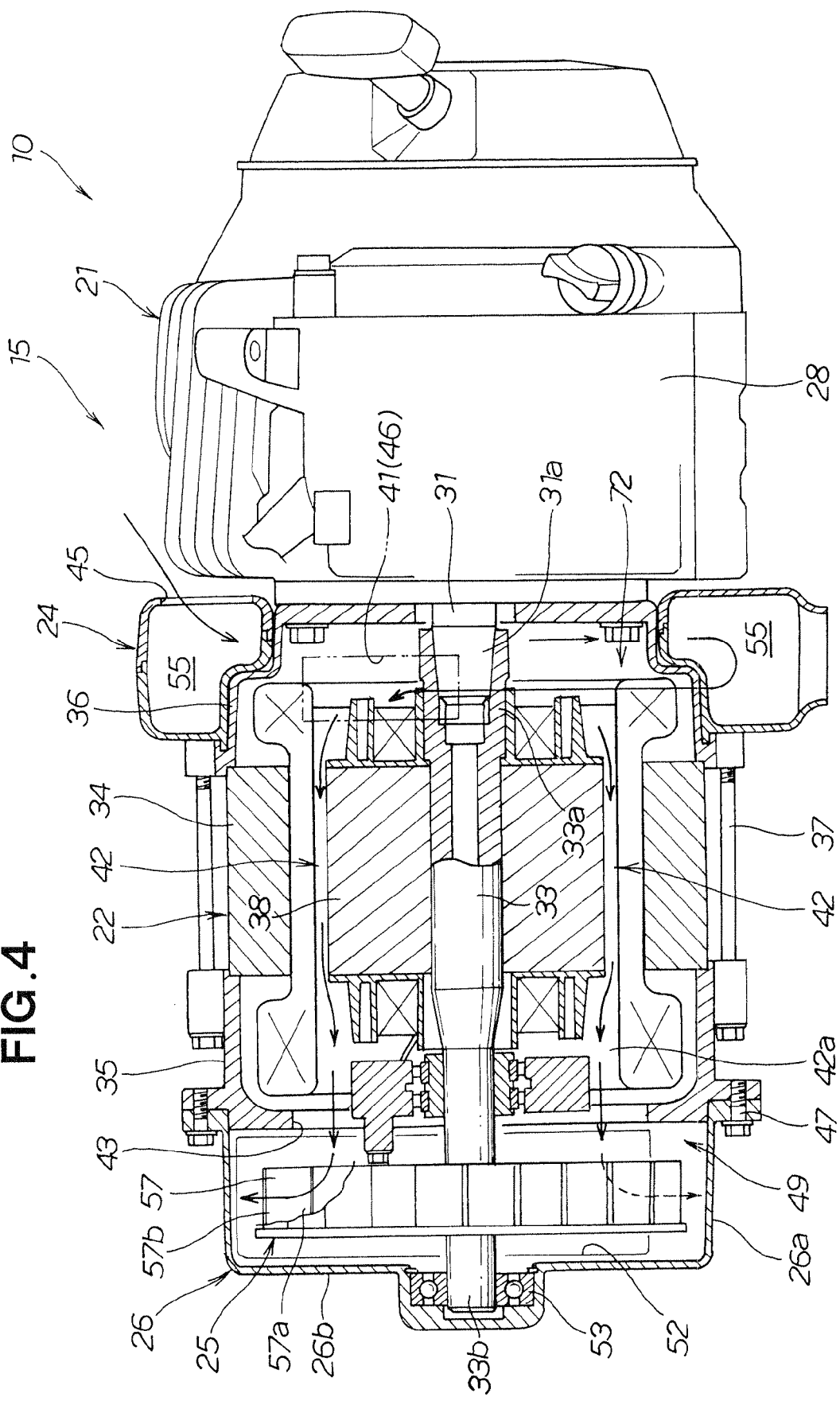
FIG. 4 is a sectional view showing a power generation section of the engine/power generation section unit.

As shown in FIG. 4, the cooling air intake passage 42 is defined by a space between the stator 34 and the rotor 38 inside the power generation section 22.

The gas-liquid separation unit 24, disposed between the power generation section 22 and the engine 21, is in the form of a generally annular duct, which has an air inlet port (also referred to as "duct inlet port") 45 formed in one end portion 24a and an air outlet port (also referred to as "duct outlet port") 46 in the other end portion 24b.

The duct inlet port 45 is located immediately under the fuel tank 16 shown in FIG. 1, and it is in communication with the inlet port 41 of the power generation section 22.

The gas-liquid separation unit 24 is disposed upstream of the power generation section 22 for separating moisture contained in air taken in or introduced through the air outlet port 46. Details of the gas-liquid separation unit 24 will be discussed later with reference to FIGS. 5 and 6.

In a front-side region of the power generation section 22, the cooling fan 25 is provided on the drive shaft 33 projecting forward beyond the front cover 35, and the cooling fan 25 has a rear end portion 25a facing the front wall 35a (more specifically, outlet port 43 of the power generation section 22) of the front cover 35. For example, the cooling fan 25 is in the form of a scirocco fan, for a reason to be explained later in relation to FIG. 4.

The cooling fan 25 is covered with the fan cover 26. The fan cover 26 is fixed, by means of bolts 47, to the front end portion 22a of the front cover 35 of the power generation section 22. The fan cover 26 has an interior space 49 (see also FIG. 4) communicating with a front end portion 42a of the cooling air intake passage 42, and it also has an outlet port 52 (see also FIG. 4) formed in a substantial one-third region of its circumferential wall 26a.

As shown in FIG. 4, the outlet port 52 is in communication with the cooling air intake passage 42 via the interior space 49. Bearing 53 is provided on a front wall 26b of the fan cover 26 as shown in FIG. 4, and the drive shaft 33 has a front end portion 33b rotatably supported on the bearing 53.

FIG. 4 is a sectional view showing the power generation section 22 of the engine/power generation section unit 15 employed in the instant embodiment. The cooling fan 25 is accommodated in the interior space 49 of the fan cover 26. The interior space 49 of the fan cover 26 is in communication with the cooling air intake passage 42 via the outlet port 43 of the front cover 35.

Further, the cooling air intake passage 42 is in communication with an interior space 55 of the gas-liquid separation unit 24 via the inlet port 41 of the rear cover 36 and air outlet port 46 of the gas-liquid separation unit 24.

Further, the interior space 55 of the gas-liquid separation unit 24 is in communication with the outside via the air inlet port 45 of the gas-liquid separation unit 24. Thus, the interior space 49 of the fan cover 26 is in communication with the outside via the cooling air intake passage 42 and interior space 55 of the gas-liquid separation unit 24.

Further, the interior space 49 of the fan cover 26 is in communication with the outside via the outlet port 52. Thus, by rotation of the cooling fan 25, cooling air can be delivered to the interior space 49 of the fan cover 26, and the thus-delivered air can be discharged out of the power generator 10 via the outlet port 52.

As the air is thus delivered by the rotation of the cooling fan 25, air within the cooling air intake passage 42 and gas-liquid separation unit 24 can be sucked in by the cooling fan 25. In this way, external air taken in to the cooling air intake passage 42 through the duct inlet port 45 can be directed through the interior of the power generation section 22 to thereby cool the power generation section 22.

The cooling air intake passage 42 is formed using the space between the stator 34 and the rotor 38. Therefore, the cooling air intake passage 42 is located more or less close to the drive shaft 33. This is the reason why the cooling fan 25 is in the form of a scirocco fan having a plurality of vanes 57. The cooling fan 25 takes in air though a portion thereof adjacent to the radially inner ends 57a of the vanes 57 and sends out the taken-in air through a portion thereof adjacent to the radially outer ends 57b of the vanes 57.

The radially inner ends 57a of the vanes 57 of the cooling fan 25 is preferably disposed in axial alignment with the cooling air intake passage 42. Thus, air in the cooling air intake passage 42 can be directed straightly toward the cooling fan 25 without its flowing direction being changed. In this way, the air in the cooling air intake passage 42 can be efficiently taken in by the cooling fan 25.

In the instant embodiment of the engine-driven power generator 10, as the engine 21 is driven to rotate the crankshaft 31, the drive shaft 33 rotates together with the crankshaft 31. Thus, the rotator 38 rotates together with the drive shaft 33, so that electric power is generated.

Further, as the drive shaft 33 rotates, the cooling fan 25 rotates to deliver air downstream to the interior space 49 of the fan cover 26. The air thus delivered to the interior space 49 is discharged out of the power generator through the outlet port 52.

Meanwhile, by the rotation of the cooling fan 25, air is taken in from upstream of the cooling fan 25 (i.e., from the cooling air intake passage 42 of the power generation section 22). Thus, external air taken in through the duct inlet port 45 is directed to the cooling air intake passage 42 through the inlet port 41 of the power generation section 22, as indicated by an arrow. By the air, directed to the cooling air intake passage 42, flowing along the passage 42, the power generation section 22 can be cooled.

Figure 5:
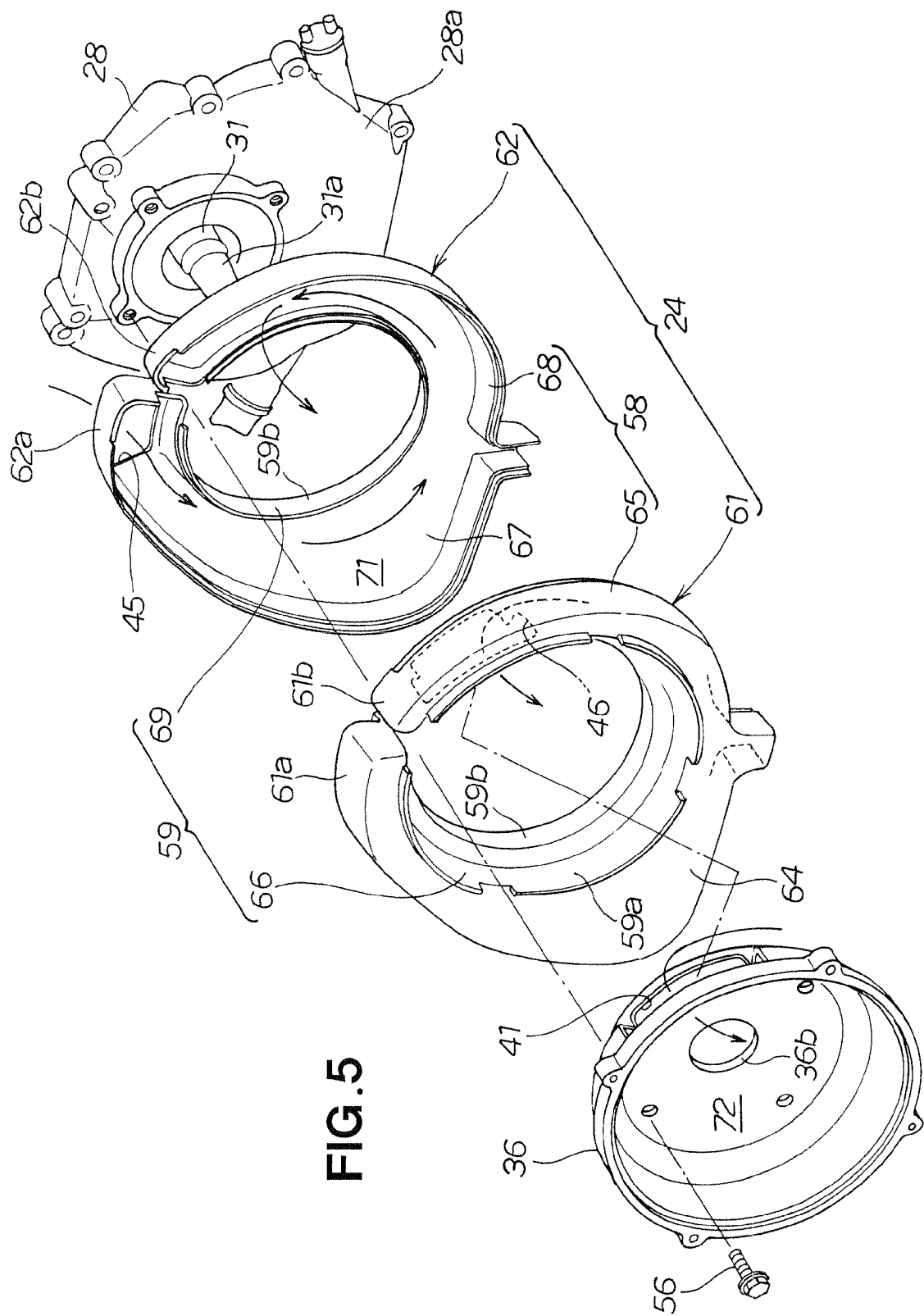
FIG. 5 is an exploded perspective view showing a gas-liquid separation unit employed in the instant embodiment of the engine-driven power generator.

FIG. 5 is an exploded perspective view showing the gas-liquid separation unit 24 in the instant embodiment of the engine-driven power generator. The rear cover 36 is fixed to the front wall portion 28a of the crankcase 28 by means of bolts 56 in such a manner that the front end portion 31a of the crankshaft 31 projects into the interior space 72 through a central opening 36b of the rear cover 36. The gas-liquid separation unit 24 is attached to the rear cover 36 by means of a fastener member (not shown).

The gas-liquid separation unit 24, which is in the form of a duct formed into a generally annular shape, comprises a front-half duct section 61 and rear-half duct section 62 secured together. Because the gas-liquid separation unit 24 comprises the front-half duct section 61 and rear-half duct section 62 integrally secured together, it can be formed with ease.

The front-half duct section 61 is formed in such an annular shape that that one end 61a and the other end 61b thereof are located adjacent to each other in opposed relation to each other, and has a generally concave sectional shape defined by a front wall 64, front outer peripheral wall 65 and front inner peripheral wall 66. The air outlet port (duct outlet port) 46 is formed in a portion of the front inner peripheral wall 66 adjacent to the other end 61b.

The rear-half duct section 62 is also formed in such an annular outer shape that one end 62a and the other end 62b thereof are located adjacent to each other in opposed relation to each other, and has a generally concave sectional shape defined by a rear wall 67, rear outer peripheral wall 68 and rear inner peripheral wall 69. The duct outlet port 45 is formed in a portion of the rear wall 67 adjacent to the one end 62a.

The gas-liquid separation unit 24 is assembled as an integral unit with the front outer peripheral wall 65 of the front-half duct section 61 and the rear outer peripheral wall 68 of the rear-half duct section 62 intercoupled with each other and with the front inner peripheral wall 66 of the front-half duct section 61 and rear inner peripheral wall 69 of the rear-half duct section 62 intercoupled with each other. With the front-half duct section 61 and the rear-half duct section 62 intercoupled with each other in the aforementioned manner, the gas-liquid separation unit 24 has a substantially rectangular closed sectional shape.

Further, the front outer peripheral wall 65 and rear outer peripheral wall 68 are intercoupled with each other to provide an outer peripheral wall 58 of the gas-liquid separation unit 24. The front inner peripheral wall 66 and rear inner peripheral wall 69 are intercoupled with each other to provide an inner peripheral wall 59 of the gas-liquid separation unit 24.

In the gas-liquid separation unit 24, the inner peripheral wall 59 has a stepped shape defined by a large-diameter inner peripheral wall portion 59a and a small-diameter inner peripheral wall portion 59b, and the inner peripheral wall 59 is fitted over the rear cover 36 from the rear. With the inner peripheral wall 59 fitted over the rear cover 36, the duct outlet port 46 of the gas-liquid separation unit 24 is lapped over the inlet port 41 of the rear cover 36.

Thus, air is directed through the duct inlet port 45 to an interior space 71 of the gas-liquid separation unit 24 as indicated by an arrow. The air thus directed to the interior space 71 is then directed along the inner peripheral wall 59 as indicated by arrows and then directed to the interior space 72 of the rear cover 36 via the duct outlet port 46 and inlet port 41 of the power generation section 22. The air directed to the interior space 72 of the rear cover 36 is directed to the interior space 49 of the fan cover 26 by way of the cooling air intake passage 42 shown in FIG. 4.

FIG. 6 is a sectional view showing the gas-liquid separation unit 24 in the instant embodiment of the engine-driven power generator 10. The gas-liquid separation unit 24 has the air inlet port 45 provided in its one end portion 24a, and the air outlet port 46 provided in it's the other end portion 24b for discharging air, taken in through the air inlet port 45, to outside of the gas-liquid separation unit 24 and hence the engine-driven power generator 10. The gas-liquid separation unit 24 is formed into an annular shape such that the duct inlet port 45 and duct outlet port 46 are located adjacent to each other in an upper duct portion 24c of the gas-liquid separation unit 24. The air inlet port 45 is located immediately under the fuel tank 16 and covered with the fuel tank 16.

The gas-liquid separation unit 24 has a centrifugal separation section 75 provided, in a lead-in-side region (left-half region) thereof between the duct inlet port 45 and a lower duct portion 24d, for separating moisture, contained in the air, from the air by centrifugal force. The gas-liquid separation unit 24 also has a by-weight separation section 76 provided, in a lead-out-side region (right-half region) thereof between the lower duct portion 24d and the air outlet portion 46, for separating moisture, contained in the air, from the air utilizing the weight of the moisture. The gas-liquid separation unit 24 also has a stepped portion 77 in the lower duct portion 24d, and a downward water discharge port 78 in the stepped portion 77.

In the centrifugal separation section 75, the inner peripheral wall 59 has a circular shape having a radius R, and the outer peripheral wall 58 is spaced radially outwardly from the inner peripheral wall 59 by a relatively great distance L1.

Thus, once air taken in through the duct inlet port 45 flows as indicated by arrow A to reach the centrifugal separation section 75, moisture contained in the air (hereinafter referred to as "air-contained moisture") 81 is driven radially outwardly by centrifugal force as indicated by arrows B. Thus, the air-contained moisture 81 is separated from the air by the centrifugal separation section 75.

The air-contained moisture, having been separated from the air, hits the outer peripheral wall 58 of the centrifugal separation section 75, then flows toward the lower duct portion 24d as indicated as arrow C, and then is discharged through the discharge port 78 as indicated by arrow D.

The stepped portion 77 is provided in the lower duct portion 24d in opposed relation to the centrifugal separation section 75, and the stepped portion 77 has a height S relative to the lower duct portion 24d. Thus, the moisture 81 having flown to the lower duct portion 24d can be reliably discharged through the discharge port 78 by hitting the stepped portion 77. Note that the height S of the stepped portion 77 is set so as not to disturb a flow of the air having been directed from the centrifugal separation section 75 toward the lower duct portion 24d.

In the by-weight separation section 76, which is provided below the air outlet port 46 and power-generation-section inlet port 41, the inner peripheral wall 59 has a circular shape having a radius R, and the outer peripheral wall 58 is spaced radially outwardly from the inner peripheral wall 59 by a distance L2. The distance L2 in the by-weight separation section 76 is set greater than a distance L3 between the outer peripheral wall 58 and the inner peripheral wall 59 in the lower duct portion 24d.

Namely, the by-weight separation section 76 has a cross-sectional area of flow (S1 not shown) greater than a cross-sectional area of flow (S2 not shown) of the lower duct portion 24d. Thus, a flow speed of the air, having passed the lower duct portion 24d, decreases as the air flows upward, as indicated by arrow E, to the by-weight separation section 76. Because the flow of the air speed decreases, a force acting to push upward moisture still remaining in the air (hereinafter referred to as "residual moisture") 82 decreases, so that the residual moisture 82 drops down due to its own weight as indicated by arrow F.

In the aforementioned manner, the residual moisture 82 is separated from the air via the by-weight separation section 76. The thus-separated residual moisture 82 hits the outer peripheral wall 58 in the by-weight separation section 76 and then flows toward the lower duct portion 24d as indicated by arrow G, after which the residual moisture 82 is discharged through the discharge port 78 by way of the stepped portion 77.

Meanwhile, the air having the residual moisture 82 separated or removed therefrom by the by-weight separation section 76 is directed to the interior space 72 of the rear cover 36 by way of the duct outlet port 46 and inlet port 41 of the power generation section 22.

Namely, because the gas-liquid separation unit 24 is disposed upstream of the rear cover 36 (i.e., upstream of the power generation section 22), it can separate the moisture from the air taken in through the duct inlet port 45 and direct the resultant moisture-removed air to the power generation section 22.

The following paragraph describe how the power generation section 22 is cooled in the engine-driven power generator 10, with reference to FIGS. 7 and 8.

Figure 7A:
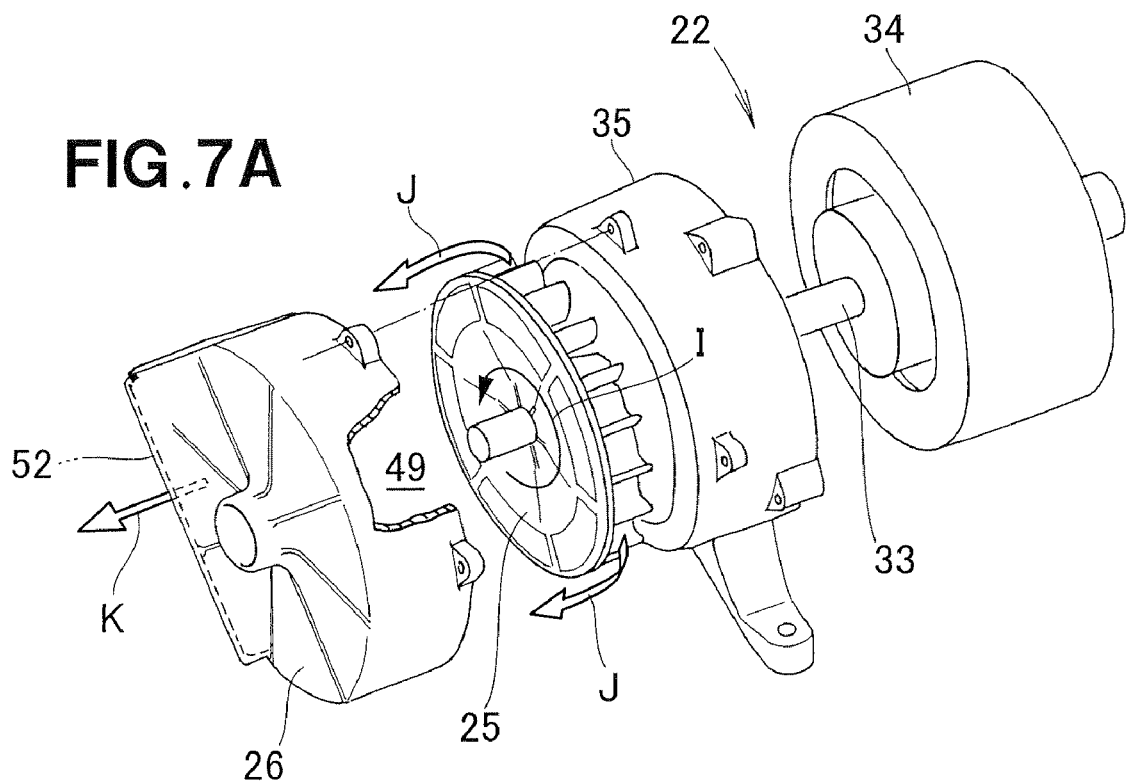
FIGS. 7A and 7B are views explanatory of how air is taken in by a cooling fan in the engine-driven power generator.
Figure 7B:
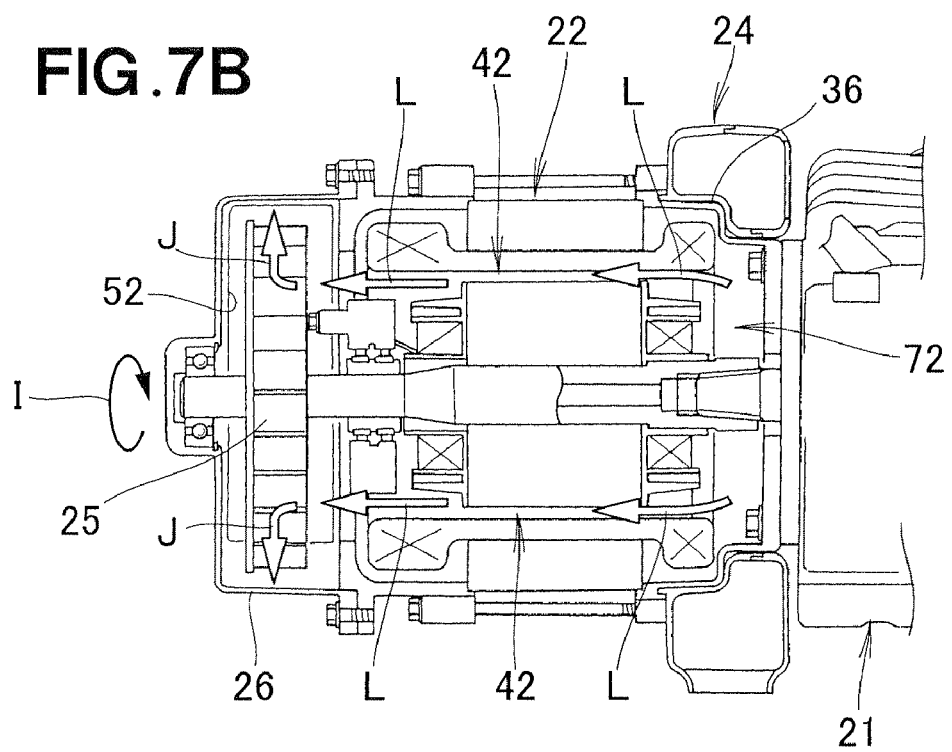

FIGS. 7A and 7B are views explanatory of how air is taken in by rotation of the cooling fan 25 in the engine-driven power generator 10. Namely, as the engine 21 rotates the drive shaft 33, the cooling fan 25 rotates together with the drive shaft 33 as indicated by arrow I in FIG. 7A. By rotation of the cooling fan 25, air is delivered from the cooling fan 25 downstream (namely, to the interior space 49 of the fan cover 26) as indicated by arrow J and then discharged to the outside via the cover outlet port 52 as indicated by arrow K.

Also, by the rotation of the cooling fan 25, air is sucked in from upstream of the cooling fan 25 (i.e., from the cooling air intake passage 42 within the power generation section 22 and the interior space 72 of the rear cover 36) as indicated by arrow L in FIG. 7B.

Figure 8A:
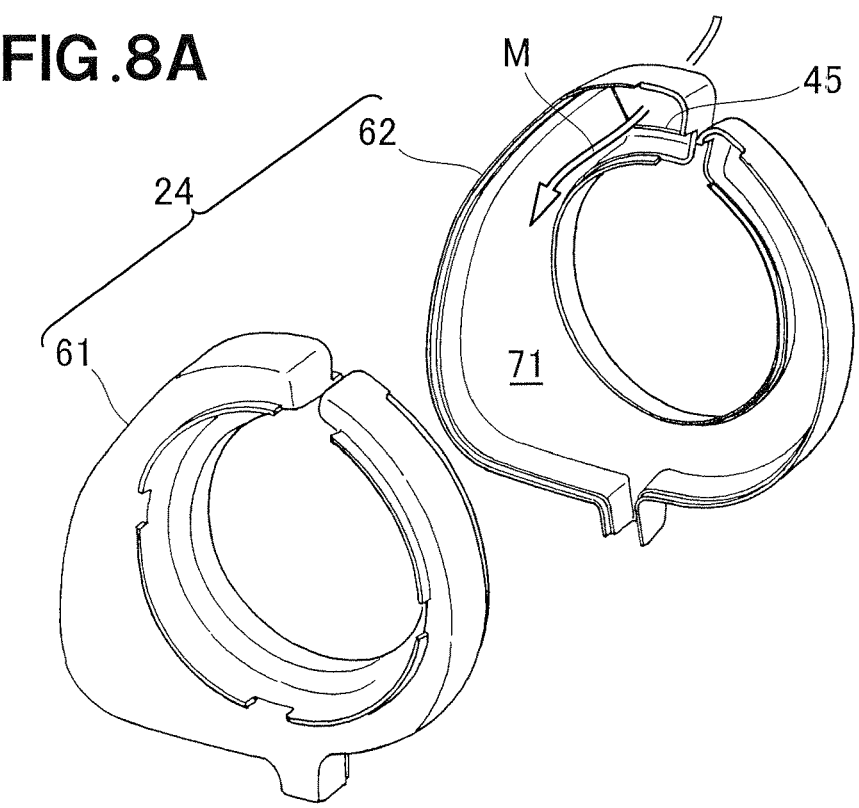
FIGS. 8A and 8B are views explanatory of how air-contained moisture is separated from air by the gas-liquid separation unit.
Figure 8B:
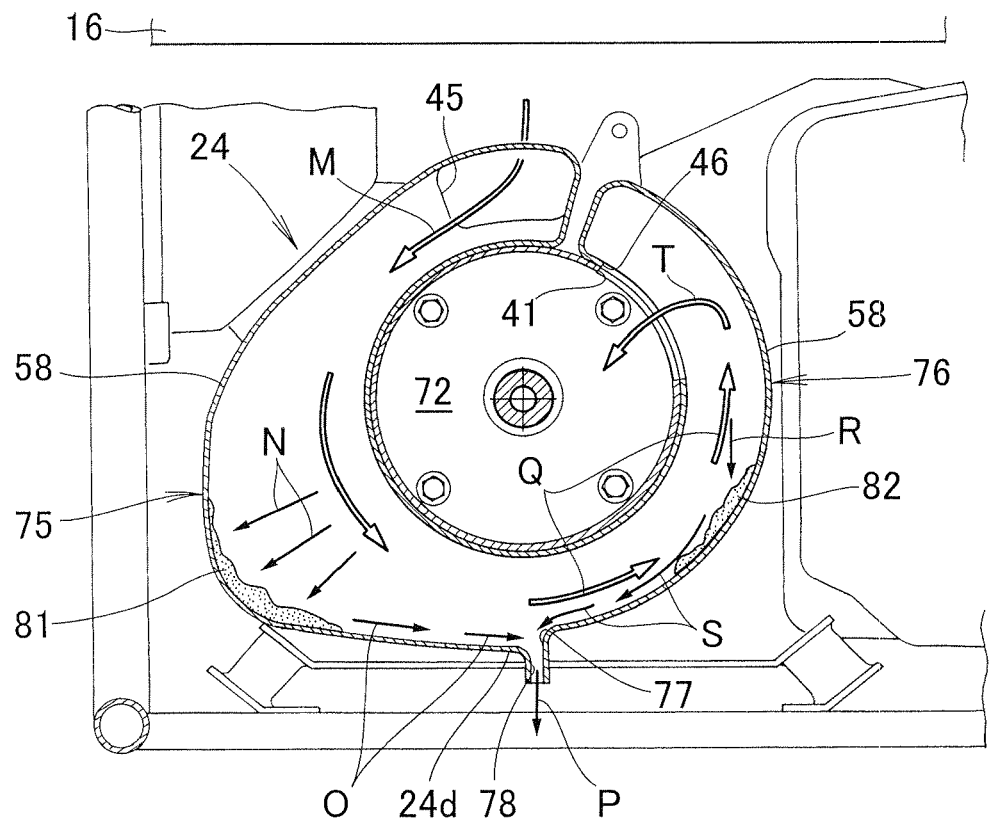

FIGS. 8A and 8B are views explanatory of how air-contained moisture is separated from the air by the gas-liquid separation unit 24. As the air is sucked in, by the rotation of the cooling fan 25, from the cooling air intake passage 42 within the power generation section 22 and interior space 72 of the rear cover 36 (shown in FIG. 7B), external air is taken in, through the air inlet port 45 of the gas-liquid separation unit 24, to the interior space 71 of the gas-liquid separation unit 24 as indicated by arrow M.

Because the air inlet port 45 is disposed immediately under the fuel tank 16, the duct inlet port 45 can be covered with the fuel tank 16. Thus, even in an environment where the engine-driven power generator 10 tends to easily get wet with moisture, it is possible to prevent moisture-containing air from being taken in through the air inlet port 45, by the fuel tank 16 covering the inlet port 45.

Once the air taken in through the air inlet port 45 flows as indicated by arrow M to reach the centrifugal separation section 75, the air-contained moisture 81 is driven radially outwardly by centrifugal force as indicated by arrows N. Thus, the air-contained moisture 81 is separated from the air and hits the outer peripheral wall 58 of the centrifugal separation section 75, then flows toward the lower duct portion 24d as indicated as arrow O, and then hits the stepped portion 77 so that it is directed to and discharged through the discharge port 78 as indicated by arrow P.

Meanwhile, the taken-in air passes the lower duct portion 24d, flows upward as indicated by arrow Q and reaches the by-weight separation section 76. Because the by-weight separation section 76 has the cross-sectional area of flow (S1) greater than the cross-sectional area of flow (S2) of the lower duct portion 24d, the flow speed of the air decreases once the air is directed to the by-weight separation section 76. Because of the decrease in the flow speed of the air, the force acting to push upward the residual moisture 82 decreases, so that the residual moisture 82 drops down due to its own weight as indicated by arrow R.

In the aforementioned manner, the residual moisture 82 is separated from the air, hits the outer peripheral wall 58 in the by-weight separation section 76 and then flows toward the lower portion 24d as indicated by arrow S, after which the residual moisture 82 is discharged through the discharge port 78 by way of the stepped portion 77.

Meanwhile, the air having the residual moisture 82 removed therefrom by the by-weight separation section 76 is directed to the interior space 72 of the rear cover 36 by way of the air outlet port 46 and inlet port 41 of the power generation section 22 as indicated by arrow T. In this way, the air with no moisture contained therein can be introduced into the power generation section 22 (namely, interior space 72 of the rear cover 36).

Referring back to FIG. 7B, the air having been introduced to the interior space 72 of the rear cover 36 is directed to the interior space 49 of the fan cover 26 by way of the cooling air intake passage 42 within the power generation section 22 as indicated by arrow L. Thus, the power generation section 22 can be cooled by the air flowing along the cooling air intake passage 42 as indicated by arrow L.

In the above-described embodiment of the engine-driven power generator 10, where the air inlet port 45 is covered with the fuel tank 16, it is possible to prevent moisture-contained air from being introduced to the power generation section 22 through the duct inlet port 45. In addition, with the gas-liquid separation unit 24 provided upstream of the power generation section 22, moisture can be separated from the air and discharged out of the power generator 10. In this way, the embodiment of the engine-driven power generator 10 can reliably prevent moisture-containing air from being undesirably introduced into the power generation section 22, with the result that the limitation on the use of the power generator 10 in an environment where the power generator 10 tends to easily get wet with water or moisture can be effectively reduced or lessened.

Whereas the embodiment of the engine-driven power generator 10 of the present invention has been described above in relation to the case where the gas-liquid separation unit 24 comprises the centrifugal separation section 75 and by-weight separation section 76, the present invention is not so limited; for example, the gas-liquid separation unit 24 may comprise only either one of the centrifugal separation section 75 and by-weight separation section 76.

Further, whereas the embodiment of the engine-driven power generator 10 has been described above in relation to the case where the gas-liquid separation unit 24 has the stepped portion 77, such a stepped portion 77 may be dispensed with.

Furthermore, whereas the embodiment of the engine-driven power generator 10 has been described above in relation to the case where the gas-liquid separation unit 24 is constructed of the front- and rear-half duct sections secured together, the gas-liquid separation unit 24 may be constructed as a one-piece integral unit.

The present invention is well suited for application to engine-driven power generators which have a drive shaft of a power generation section connected to a crankshaft of an engine, and in which a cooling fan is rotated by the drive shaft to direct cooling air into the power generation section.

Obviously, various minor changes and modifications of the present invention are possible in light of the above teaching. It is therefore to be understood that within the scope of the appended claims the invention may be practiced otherwise than as specifically described.

What is claimed is:

1. An engine-driven power generator comprising:
   a power generation section having a drive shaft connected to a crankshaft of an engine, a fuel tank of the engine being disposed over the power generation section and the engine;
   a gas-liquid separation unit provided upstream of the power generation section and having an air inlet port for taking in cooling air, the air inlet port being disposed immediately under the fuel tank, the gas-liquid separation unit separating moisture, contained in the cooling air taken in via the air inlet port, from the air; and
   a cooling fan rotatable by the drive shaft to direct, into the power generation section, the cooling air taken in via the air inlet port and having the moisture separated therefrom via the gas-liquid separation unit,
   wherein the gas-liquid separation unit has the air inlet port formed in one end portion thereof, and an air outlet port formed in another end portion thereof for discharging the air, taken in through the air inlet port, out of the gas-liquid separation unit,
   the gas-liquid separation unit is in a form of a duct formed into a generally annular shape such that the air inlet port and the air outlet port are located adjacent to each other in an upper duct portion of the gas-liquid separation unit, and
   the gas-liquid separation unit includes:
      a centrifugal separation section provided, in a region of the gas-liquid separation unit between the air inlet port and a lower duct portion, for separating moisture, contained in the air, from the air by centrifugal force; and
      a by-weight separation section provided, in another region of the gas-liquid separation unit between the lower duct portion and the air outlet portion, for separating moisture, contained in the air, from the air utilizing a weight of the moisture.

2. The engine-driven power generator of claim 1, wherein the lower duct portion has a stepped portion opposed to the centrifugal separation section, and the stepped portion has a downward water discharge port formed therein for discharging the separated moisture out of the gas-liquid separation unit.

* * * * *

UNITED STATES PATENT AND TRADEMARK OFFICE
CERTIFICATE OF CORRECTION

| | | |
|---|---|---|
| PATENT NO. | : 8,093,732 B2 | Page 1 of 1 |
| APPLICATION NO. | : 12/403012 | |
| DATED | : January 10, 2012 | |
| INVENTOR(S) | : Hatsugai et al. | |

It is certified that error appears in the above-identified patent and that said Letters Patent is hereby corrected as shown below:

Title page

Item 73 – Assignee

(73)    Assignee:    ~~HHonda Motor Co., Ltd.~~

Should be:

(73)    Assignee:    Honda Motor Co., Ltd.

Signed and Sealed this
Twentieth Day of March, 2012

David J. Kappos
*Director of the United States Patent and Trademark Office*